United States Patent
Tanabe et al.

(10) Patent No.: US 10,609,510 B2
(45) Date of Patent: Mar. 31, 2020

(54) MOBILE ELECTRONIC APPARATUS, MOBILE ELECTRONIC APPARATUS CONTROL METHOD, A NON-TRANSITORY COMPUTER READABLE RECORDING MEDIUM, FOR PROVIDING WARNINGS TO A USER OF THE APPARATUS BASED ON THE LOCATION OF THE ELECTRONIC APPARATUS

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/165,820

(22) Filed: Oct. 19, 2018

(65) Prior Publication Data

US 2019/0053001 A1    Feb. 14, 2019

Related U.S. Application Data

(63) Continuation of application No. PCT/JP2017/015139, filed on Apr. 13, 2017.

(30) Foreign Application Priority Data

Apr. 27, 2016 (JP) .................................. 2016-089629

(51) Int. Cl.
*H04W 24/00* (2009.01)
*H04M 11/04* (2006.01)
(Continued)

(52) U.S. Cl.
CPC ....... *H04W 4/021* (2013.01); *H04M 1/72538* (2013.01); *H04M 1/72569* (2013.01);
(Continued)

(58) Field of Classification Search
CPC ... H04W 4/021; H04W 4/80; H04M 1/72538; H04M 1/72569; H04M 1/72572; H04M 2250/12
(Continued)

(56) References Cited

U.S. PATENT DOCUMENTS 8,566,029 B1 * 10/2013 Lopatenko ........... G08G 1/0962 701/426
8,818,706 B1 * 8/2014 Ogale .................. G01C 21/206 340/539.1
(Continued)

FOREIGN PATENT DOCUMENTS

| CN | 104916068 A | 9/2015 |
|---|---|---|
| JP | 2008-059068 A | 3/2008 |

(Continued)

OTHER PUBLICATIONS

Makoto Saitou et al.; "Design of a suppression system for "walk smartphone" by considering the risk of use position"; Proceedings of the 2015 IEICE General Conference Information and Systems 1; Mar. 3 to 10, 2015; p. 135; Kusatsu City, Japan.

*Primary Examiner* — German Viana Di Prisco
*Assistant Examiner* — Mark G. Pannell
(74) *Attorney, Agent, or Firm* — Studebaker & Brackett PC (57) ABSTRACT

A mobile electronic apparatus comprises: a display; a first detector configured to obtain first information; a second detector configured to obtain second information; a broadcast unit; and at least one processor, wherein the at least one processor causes the display to display a first image if
(Continued)

detecting, based on the first information, that a user is walking and determining, based on the second information, that the user is in an area other than a predetermined area, and the at least one processor causes the display to produce a screen display and causes the broadcast unit to perform a first broadcast when detecting, based on the first information, that the user is walking and determining, based on the second information, that the user is in the predetermined area.

10 Claims, 8 Drawing Sheets

(51) Int. Cl.
  *H04W 4/021* (2018.01)
  *H04M 1/725* (2006.01)
  *H04W 4/80* (2018.01)
(52) U.S. Cl.
  CPC ......... *H04M 1/72572* (2013.01); *H04W 4/80* (2018.02); *H04M 2250/12* (2013.01)
(58) Field of Classification Search
  USPC ..................................... 455/456.1
  See application file for complete search history.

(56) References Cited

U.S. PATENT DOCUMENTS

| | | | | |
|---|---|---|---|---|
| 9,718,405 | B1* | 8/2017 | Englander | G01S 19/13 |
| 2011/0103302 | A1* | 5/2011 | Hall | A63F 13/10 |
| | | | | 370/328 |
| 2013/0085861 | A1* | 4/2013 | Dunlap | G01S 19/34 |
| | | | | 705/14.58 |
| 2013/0183924 | A1* | 7/2013 | Saigh | H04W 4/029 |
| | | | | 455/404.2 |
| 2014/0066097 | A1* | 3/2014 | Kolodziej | H04W 4/023 |
| | | | | 455/456.3 |
| 2014/0080540 | A1 | 3/2014 | Hsiao | |
| 2014/0087711 | A1* | 3/2014 | Geyer | H04W 4/021 |
| | | | | 455/418 |
| 2014/0180960 | A1* | 6/2014 | Sagfors | G06Q 30/0281 |
| | | | | 705/346 |
| 2014/0357213 | A1 | 12/2014 | Tanaka et al. | |
| 2015/0271742 | A1* | 9/2015 | Moskowitz | H04W 4/025 |
| | | | | 370/328 |
| 2015/0304817 | A1 | 10/2015 | Yorifuji | |
| 2016/0253560 | A1* | 9/2016 | Tokutake | G06F 3/0412 |
| | | | | 382/103 |

FOREIGN PATENT DOCUMENTS

| | | |
|---|---|---|
| JP | 2009-267770 A | 11/2009 |
| JP | 2013-131143 A | 7/2013 |
| JP | 2015-076714 A | 4/2015 |
| TW | 201413662 A | 4/2014 |

* cited by examiner

MOBILE ELECTRONIC APPARATUS, MOBILE ELECTRONIC APPARATUS CONTROL METHOD, A NON-TRANSITORY COMPUTER READABLE RECORDING MEDIUM, FOR PROVIDING WARNINGS TO A USER OF THE APPARATUS BASED ON THE LOCATION OF THE ELECTRONIC APPARATUS

CROSS-REFERENCE TO RELATED APPLICATION

The present application is a continuation based on PCT Application No. PCT/JP2017/015139 filed on Apr. 13, 2017, which claims the benefit of Japanese Patent Application No. 2016-089629 filed on Apr. 27, 2016. PCT Application No. PCT/JP2017/015139 is "MOBILE ELECTRONIC DEVICE, MOBILE ELECTRONIC DEVICE CONTROL METHOD, AND MOBILE ELECTRONIC DEVICE CONTROL PROGRAM", and Japanese Patent Application No. 2016-089629 is entitled "MOBILE ELECTRONIC APPARATUS, MOBILE ELECTRONIC APPARATUS CONTROL METHOD, AND MOBILE ELECTRONIC APPARATUS CONTROL PROGRAM", the contents of which are incorporated by reference herein in their entirety.

FIELD

Embodiments of the present disclosure generally relate to a mobile electronic apparatus, a mobile electronic apparatus control method, and a non-transitory computer readable recoding medium.

BACKGROUND

Some mobile electronic apparatuses that are mobile communication apparatuses can determine whether the user is moving. Conventional proposals have been made on, for example, a technology for determining whether the user is walking, using a detection result of an accelerometer, etc.

SUMMARY

A mobile electronic apparatus, a mobile electronic apparatus control method, and a non-transitory computer readable recoding medium are disclosed. A mobile electronic apparatus according to one aspect comprises: a display; a first detector configured to obtain first information; a second detector configured to obtain second information; a broadcast unit; and at least one processor. The at least one processor detects, based on the first information, that a user is walking. The at least one processor causes the display to display a first image when determining, based on the second information, that the user is in an area other than a predetermined area. The at least one processor detects, based on the first information, that the user is walking. The at least one processor causes the display to produce a screen display and causes the broadcast unit to perform a first broadcast when determining, based on the second information, that the user is in the predetermined area.

A mobile electronic apparatus control method according to one aspect is a mobile electronic apparatus control method for controlling a mobile electronic apparatus comprising a display. The mobile electronic apparatus control method comprises the steps of: obtaining first information, and determining, based on the first information, whether a user is walking; obtaining second information, and determining, based on the second information, whether the user is in a predetermined area; and causing the display to display a first image upon detection that the user is walking and upon determination that the user is in an area other than the predetermined area, and causing the display to produce a screen display and performing a first broadcast separately from producing the screen display upon detection that the user is walking and upon determination that the user is in the predetermined area.

A non-transitory computer readable recording medium stores a mobile electronic apparatus control program according to one aspect. The mobile electronic apparatus control program causes a mobile electronic apparatus comprising a display to execute the steps of: obtaining first information, and determining, based on the first information, whether a user is walking; obtaining second information, and determining, based on the second information, whether the user is in a predetermined area; and causing the display to display a first image upon detection that the user is walking and upon determination that the user is in an area other than the predetermined area, and causing the display to produce a screen display and performing a first broadcast separately from producing the screen display upon detection that the user is walking and upon determination that the user is in the predetermined area.

DETAILED DESCRIPTION

Example embodiments will be described in detail with reference to the drawings. A smartphone will be hereinafter described as an example mobile electronic apparatus.

Figure 1:
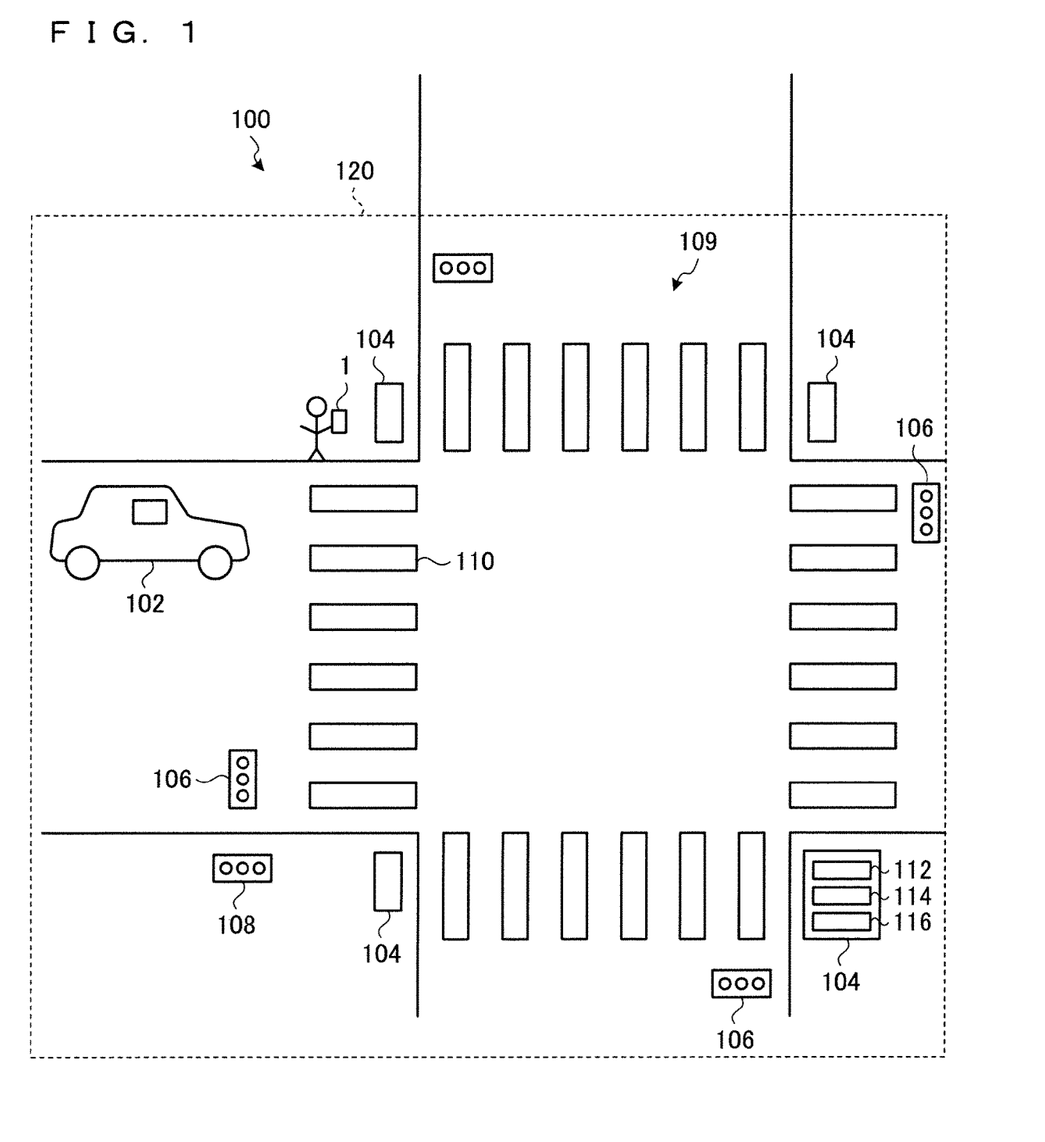
FIG. 1 illustrates a schematic diagram showing an outline structure of a control system.

An outline structure of a control system 100 comprising a smartphone 1 will be described. FIG. 1 illustrates a schematic diagram showing the outline structure of the control system. The control system 100 comprises the smartphone 1 and roadside units 104. Although FIG. 1 illustrates the one smartphone 1 and the four roadside units 104 at one intersection, the control system 100 comprises many smartphones 1 and many roadside units 104. The control system 100 comprises various communication apparatuses that communicate with the smartphone 1 and that transmit, to the smartphone 1, information on situations surrounding the smartphone 1.

The roadside units 104 control display of traffic lights 106 and traffic lights 108. The traffic lights 106 and the traffic lights 108 are located at an intersection 109. The intersection 109 has pedestrian crossings 110 across roads along which vehicles travel. The traffic lights 106 are installed for a vehicle 102. The traffic lights 106 are installed for each road at the intersection 109, and indicate whether a corresponding one of the roads is passable or is closed to traffic. The traffic lights 108 are installed for pedestrians who cross the pedestrian crossings 110. The traffic lights 108 are installed at the pedestrian crossings 110 at the intersection 109, and indicate whether a corresponding one of the pedestrian crossings 110 is passable or is closed to traffic.

Each of the roadside units 104 comprises a communication unit 112, a controller 114, and a storage 116. The communication unit 112 wirelessly communicates. The communication systems supported by the communication unit 112 are wireless communication standards. Examples of the wireless communication standards include Worldwide Interoperability for Microwave Access (WiMAX), IEEE802.11, Bluetooth (trademark), Infrared Data Association (IrDA), and near-field communication (NFC). Examples of the wireless communication standards further include communication standards for cellular phones, such as 2G, 3G, 4G, and 5G. Examples of the communication standards for cellular phones include Long Term Evolution (LTE), Wideband Code Division Multiple Access (W-CDMA), CDMA 2000, Personal Digital Cellular (PDC), Global System for Mobile Communications (GSM, trademark), and Personal Handy-phone System (PHS). The communication unit 112 may support one or more of the communication standards described above. The communication unit 112 may support wired communication. Examples of the wired communication include Ethernet (trademark) and fiber channels. The communication unit 112 communicates with the other roadside units 104, the traffic lights 106, and the traffic lights 108, and outputs signals for controlling display of the traffic lights 106 and the traffic lights 108. Furthermore, the communication unit 112 communicates with the smartphone 1 and a communication apparatus in a predetermined area 120 via near-field communication, specifically, a communication apparatus aboard the vehicle 102 to transmit and receive data.

The controller 114 is an arithmetic processing unit. The arithmetic processing unit includes, for example but not limited to, a central processing unit (CPU), a system-on-a-chip (SoC), a micro control unit (MCU), and a field-programmable gate array (FPGA). The controller 114 integrally controls operations of the roadside unit 104 to implement various functions.

Specifically, the controller 114 executes a command that is contained in a program stored in the storage 116 while referring to data stored in the storage 116 as necessary. Then, the controller 114 controls a function unit in accordance with the data and the command to thereby implement the various functions.

The storage 116 stores a program and data. The storage 116 is also used as a working space for temporarily storing processing results of the controller 114. The storage 116 may include any non-transitory storage medium such as a semiconductor storage medium and a magnetic storage medium. The storage 116 may include a plurality of types of storage media. The storage 116 may include a combination of a transportable storage medium such as a memory card, an optical disc, or a magneto-optical disk, and a reader for the storage medium. The storage 116 may include a storage device such as random access memory (RAM) that is used as a temporary storage space.

Programs to be stored in the storage 116 include a program for executing display control on the traffic lights 106 and the traffic lights 108, and a program for executing processing for establishing communication with a communication apparatus in a predetermined range and for exercising control to transmit and receive data to and from the communication apparatus. The data to be stored in the storage 116 includes reference data for controlling display of the traffic lights 106 and the traffic lights 108 installed at each position, and data to be transmitted to the other communication apparatuses.

The roadside unit 104 communicates with the other roadside units 104 installed at the intersection 109, and controls display of the traffic lights 106 and the traffic lights 108 located at the intersection 109. Specifically, the roadside unit 104 causes the traffic lights 106 and the traffic lights 108 of one of the crossing roads to indicate that the crossing road is passable, and causes the traffic lights 106 and the traffic lights 108 of the other crossing road to indicate that the other crossing road is impassable. After a lapse of a predetermined time from this state, the roadside unit 104 causes the traffic lights 106 and the traffic lights 108 of both of the crossing roads to indicate that the crossing roads are impassable. Then, the roadside unit 104 causes the traffic lights 106 and the traffic lights 108 of one of the crossing roads to indicate that the crossing road is impassable, and causes the traffic lights 106 and the traffic lights 108 of the other crossing road to indicate that the other crossing road is passable. Consequently, the roadside unit 104 restricts the vehicle 102 and persons that can pass the intersection 109, and reduces occurrence of accident in the intersection 109. Furthermore, the roadside unit 104 can control the traffic lights 106 for vehicles and the traffic lights 108 for pedestrians separately so that only pedestrians can pass or only vehicles can pass.

Figure 2:
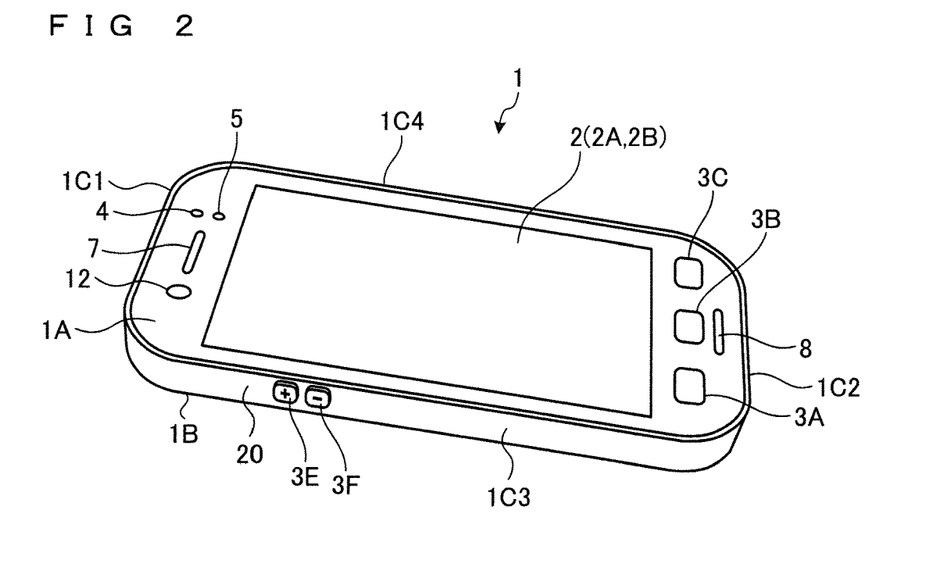
FIG. 2 illustrates a perspective view of a smartphone according to one embodiment.
Figure 3:
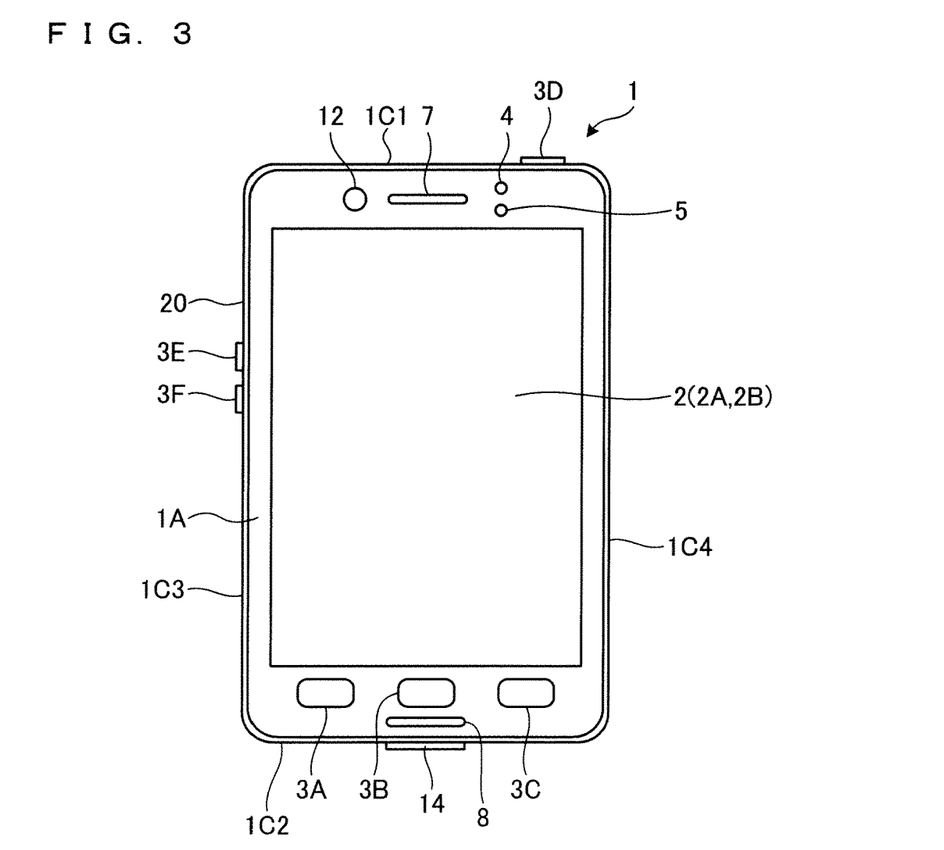
FIG. 3 illustrates a plan view of a smartphone.
Figure 4:
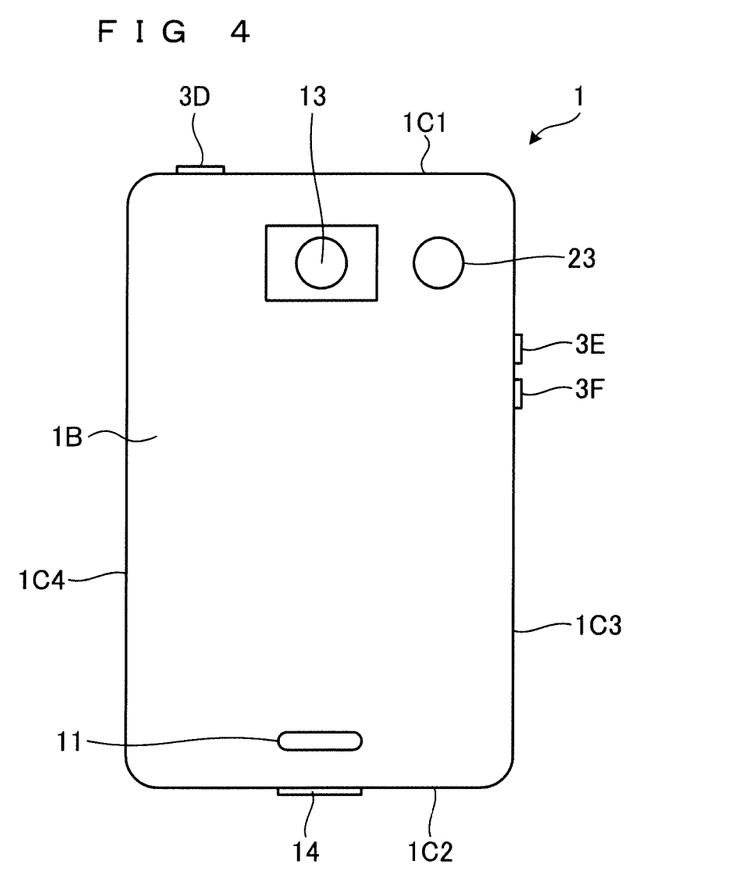
FIG. 4 illustrates a rear view of a smartphone.

Referring to FIGS. 2 to 4, an overall structure of the smartphone 1 according to one embodiment will be described. As illustrated in FIGS. 2 to 4, the smartphone 1 comprises a housing 20. The housing 20 comprises a front face 1A, a back face 1B, and side faces 1C1 to 1C4. The front face 1A is a front of the housing 20. The back face 1B is a back of the housing 20. The side faces 1C1 to 1C4 are sides connecting the front face 1A to the back face 1B. The side faces 1C1 to 1C4 may be collectively referred to as side faces 1C without identifying which one of the faces.

The smartphone 1 comprises, on the front face 1A side, a touch screen display 2, buttons 3A to 3C, an illuminance sensor 4, a proximity sensor 5, a receiver 7, a microphone 8, and a camera 12. The smartphone 1 comprises, on the back face 1B side, a speaker 11, a camera 13, and a light emitter 23. The smartphone 1 comprises, on the side faces 1C, buttons 3D to 3F and a connector 14. The buttons 3A to 3F may be collectively referred to as buttons 3 without identifying which one of the buttons.

The touch screen display 2 comprises a display 2A and a touch screen 2B. Although the display 2A and the touch screen 2B are approximately rectangular in the example of FIG. 2, the shape of the display 2A and the touch screen 2B is not limited to this. The display 2A and the touch screen 2B may be of any shape, such as square or round. Although the display 2A and the touch screen 2B are located to overlap each other in the example of FIG. 2, the positions of the display 2A and the touch screen 2B are not limited to these. The display 2A and the touch screen 2B may be located, for example, side by side or at a distance from each other. Although the long side of the display 2A extends along the long side of the touch screen 2B and the short side of the display 2A extends along the short side of the touch screen 2B in the example of FIG. 2, how to overlap the display 2A and the touch screen 2B is not limited to this. If the display 2A and the touch screen 2B are located to overlap each other, for example, one or more sides of the display 2A need not extend along any side of the touch screen 2B.

The display 2A comprises a display device such as a liquid crystal display (LCD), an organic electro-luminescence display (OELD), or an inorganic electro-luminescence display (IELD). The display 2A displays objects such as letters, images, symbols, and figures.

The touch screen 2B detects contact of a finger, a pen, a stylus pen, or the like on the touch screen 2B. The touch screen 2B can detect positions of a plurality of the fingers, pens, stylus pens, or the like in contact with the touch screen 2B.

A detection method of the touch screen 2B may be any method, such as an electrostatic capacitance method, a resistance film method, a surface acoustic wave method, an infrared method, and a load detection method. The following description assumes that the user comes in contact with the touch screen 2B using the finger to operate the smartphone 1 for simplicity's sake.

The smartphone 1 can distinguish types of gestures based on at least one of the contact detected by the touch screen 2B, a detection position of the contact, change in the detection position of the contact, detection intervals of the contact, and the number of times contact is detected. The gesture is an operation performed on the touch screen 2B. Examples of the gestures distinguished by the smartphone 1 include, but not limited to, touch, long touch, release, swipe, tap, double tap, long tap, dragging, flick, pinch-in, and pinch-out.

Figure 5:
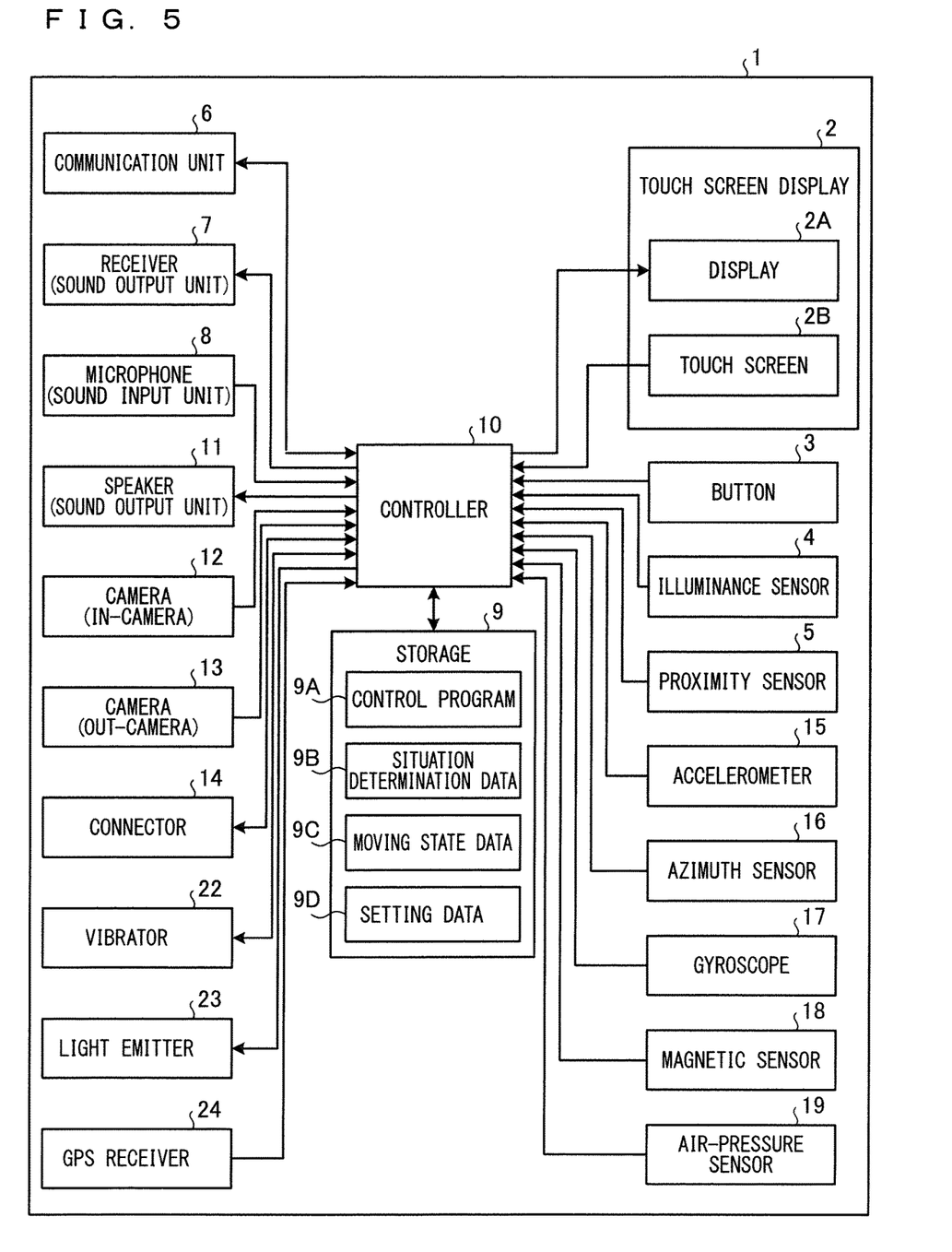
FIG. 5 illustrates a block diagram of a smartphone.

FIG. 5 illustrates a block diagram of the smartphone 1. The smartphone 1 comprises a touch screen display 2, the buttons 3, the illuminance sensor 4, the proximity sensor 5, a communication unit 6, the receiver (sound output unit) 7, the microphone (sound input unit) 8, a storage 9, a controller 10, the speaker 11, the cameras 12 and 13, the connector 14, an accelerometer 15, an azimuth sensor 16, a gyroscope 17, a magnetic sensor 18, an air-pressure sensor 19, a vibrator 22, the light emitter 23, and a GPS receiver 24. The smartphone 1 may comprise a receiver of a radio wave signal from positioning artificial satellites other than GPS satellites as a replacement or a complement for the GPS receiver 24. Examples of the positioning artificial satellites other than GPS satellites include Global Navigation Satellite System (GLONASS) artificial satellites, Indian Regional Navigational Satellite System (IRNSS) artificial satellites, COMPASS artificial satellites, and GALILEO artificial satellites.

The touch screen display 2 comprises the display 2A and the touch screen 2B as described above. The display 2A displays, for example, letters, images, symbols, or figures. The touch screen display 2B detects contact. The controller 10 detects a gesture on the smartphone 1. Specifically, the controller 10 detects an operation (gesture) on the touch screen 2B (the touch screen display 2) by cooperating with the touch screen 2B.

The buttons 3 are operated by the user. The buttons 3 comprise the buttons 3A to 3F. The controller 10 detects operations on the buttons 3 by cooperating with the buttons 3. Examples of the operations on the buttons 3 include, but not limited to, a click, a double-click, a triple-click, a push, and a multi-push.

Examples of the buttons include, for example, a home button, a back button, and a menu button. The button 3D is, for example, a power on/off button. The button 3D may also serve as a sleep/wake-up button. The buttons 3E and 3F are, for example, volume buttons.

The illuminance sensor 4 detects illuminance of light around the smartphone 1. The illuminance indicates intensity, brightness, or luminance of light. The illuminance sensor 4 is used for, for example, adjusting luminance of the display 2A. The proximity sensor 5 detects the presence of a nearby object in a non-contact manner. The proximity sensor 5 detects the presence of an object based on, for example, change in a magnetic field or change in return times of reflected ultrasonic waves. The proximity sensor 5 detects, for example, an approach of the touch screen display 2 to the face. The illuminance sensor 4 and the proximity sensor 5 may be formed as one sensor. The illuminance sensor 4 may also be used as a proximity sensor.

The communication unit 6 wirelessly communicates. The communication unit 6 of one embodiment has at least a near-field wireless function. The communication systems supported by the communication unit 6 are wireless communication standards. Examples of the wireless communication standards include the communication standards for cellular phones, such as 2G, 3G, 4G, and 5G. Examples of the communication standards for cellular phones include Long Term Evolution (LTE), Wideband Code Division Multiple Access (W-CDMA), CDMA 2000, Personal Digital Cellular (PDC), Global System for Mobile Communications (trademark, GSM), and Personal Handy-phone System (PHS). Examples of the wireless communication standards include Worldwide Interoperability for Microwave Access (WiMAX), IEEE802.11, Bluetooth (trademark), Infrared Data Association (IrDA), and near-field communication (NFC). The communication unit 6 may support one or more of the communication standards described above. The communication unit 6 may support wired communication. Examples of the wired communication include Ethernet (trademark) and fiber channels. The communication unit 6 may support a communication standard for enabling communication with a roadside unit installed at a roadside in one embodiment. The smartphone 1 may obtain, for example, information of intelligent transport systems by communicating with the roadside unit through the communication unit 6. The communication unit 6 may support a communication standard for enabling communication with a communication apparatus aboard a vehicle in one embodiment. The smartphone 1 may obtain, for example, information on the vehicle by communicating with the vehicle through the communication unit 6.

The receiver 7 and the speaker 11 are sound output units. The receiver 7 and the speaker 11 output sound signals sent from the controller 10 as sound. The receiver 7 is used for, for example, outputting voice of a calling partner during communication. The speaker 11 is used for, for example, outputting a ringtone and music. One of the receiver 7 and the speaker 11 may perform the functions of the other. The maximum value of the volume that can be output from the speaker 11 is higher than the maximum value of the volume that can be output from the receiver 7. The microphone 8 is a sound input unit. The microphone 8 converts incoming voice of the user etc. into a sound signal and sends the sound signal to the controller 10.

The storage 9 stores programs and data. The storage 9 is also used as a working space for temporarily storing processing results of the controller 10. The storage 9 may include any non-transitory storage medium such as a semiconductor storage medium and a magnetic storage medium. The storage 9 may include a plurality of types of storage media. The storage 9 may include a combination of a transportable storage medium such as a memory card, an optical disc, and a magneto-optical disk, and a reader for the storage medium. The storage 9 may include a storage device such as random access memory (RAM) that is used as a temporary storage space.

The programs to be stored in the storage 9 include applications to be executed in the foreground or the background, and a control program that supports operations of the applications. The applications cause, for example, the display 2A to display an image, and the controller 10 to execute a process corresponding to the gesture detected through the touch screen 2B. Examples of the control program include an OS. The applications and the control program may be installed in the storage 9 through communication performed by the communication unit 6 or via a non-transitory storage medium.

The storage 9 stores, for example, a control program 9A, situation determination data 9B, moving state data 9C, and setting data 9D. The situation determination data 9B includes method information on a method for determining a surrounding situation based on the information detected by the various sensors, and processing information on predetermined processing to be executed by the smartphone 1 based on the determined surrounding situation. The method information in the situation determination data 9B includes, for example, reference data for determining whether the user is in the predetermined area 120. Specifically, this reference data includes, for example, identification information for communication of the roadside units 104. The smartphone 1 determines that the user is in the predetermined area 120, for example, upon receipt of the identification information from the roadside unit 104. In other words, the smartphone 1 determines that the user is in the predetermined area 120 if establishing communication with the roadside unit 104. The communication unit 6 can be regarded as one type of sensors for detecting that the user is in the predetermined area 120. For example, the processing information is information indicating a condition for executing the predetermined processing, and the predetermined processing is broadcast processing to be described later in detail. Examples of the condition for executing the predetermined processing include the user being in the predetermined area 120.

The moving state data 9C includes information to be used for estimating the way the user moves. The moving state data 9C stores correspondence between the ways of moving and the detection results of sensors (for example, the accelerometer 15, the azimuth sensor 16, and the gyroscope 17) that are detected in advance through tests or simulations, etc. The moving state data 9C according to one embodiment includes, as the correspondence, reference data for determining whether the user is walking. For example, typical acceleration time-series data during walk (may be referred to as registered data for walking) may be used as the reference data. The controller 10 can determine that the user is walking if the detected acceleration time-series data is similar to the registered data for walking. The setting data 9D includes information on various settings concerning operations of the smartphone 1.

The control program 9A provides functions of various controls for operating the smartphone 1. The control program 9A implements a telephone call through controlling, for example, the communication unit 6, the receiver 7, and the microphone 8. The functions provided by the control program 9A include a function for controlling information to be displayed on the display 2A. The functions provided by the control program 9A include a function for performing the various controls, such as changing the information to be displayed on the display 2A according to the gesture detected through the touch screen 2B. The functions provided by the control program 9A are sometimes used in combination with the functions provided by the other programs such as a mail application.

The controller 10 can integrally manage the operations of the smartphone 1 through controlling the other constituent elements of the smartphone 1. In other words, the controller 10 is a control circuit. The controller 10 includes at least one processor for providing control and processing capability to implement the various functions as will be described in further detail below.

In accordance with various embodiments, the at least one processor may be implemented as a single integrated circuit (IC) or as multiple communicatively coupled ICs and/or discrete circuits. The at least one processor can be implemented in accordance with various known technologies.

In one embodiment, the processor includes, for example, one or more circuits or units configured to perform one or more data computing procedures or processes by executing instructions stored in an associated memory. In the other embodiments, the processor may be implemented as firmware (e.g. discrete logic components) configured to perform one or more data computing procedures or processes.

In accordance with the various embodiments, the processor may include one or more processors, controllers, microprocessors, microcontrollers, application specific integrated circuits (ASICs), digital signal processors, programmable logic devices, field programmable gate arrays, any combination of these devices or structures, or a combination of the other known devices and structures, to implement the functions described herein.

In this example, the controller 10 is an arithmetic processing unit. The arithmetic processing unit includes, for example but not limited to, a central processing unit (CPU), a system-on-a-chip (SoC), a micro control unit (MCU), and a field-programmable gate array (FPGA). The controller 10 integrally controls the operations of the smartphone 1 to implement the various functions.

Specifically, the controller 10 executes a command that is contained in a program stored in the storage 9 while referring to the data stored in the storage 9 as necessary. Then, the controller 10 controls a function unit in accordance with the data or the command, to thereby implement the various functions. The function unit may include, for example but not limited to, at least one of the display 2A, the communication unit 6, the receiver 7, and the speaker 11. The controller 10 may change control depending on a detection result of a detection unit. The detection unit may include, for example but not limited to, at least one of the touch screen 2B, the buttons 3, the illuminance sensor 4, the proximity sensor 5, the microphone 8, the camera 12, the camera 13, the accelerometer 15, the azimuth sensor 16, the gyroscope 17, the magnetic sensor 18, and the air-pressure sensor 19.

The controller 10 executes, for example, the control program 9A to implement the various controls, such as changing the information to be displayed on the display 2A according to the gesture detected through the touch screen 2B.

The camera 12 is an in-camera that captures an image of an object that faces the front face 1A. The camera 13 is an out-camera that captures an image of an object that faces the back face 1B.

The connector 14 is a terminal to which another device is connected. The connector 14 may be a general terminal such as a Universal Serial Bus (USB), a High-Definition Multimedia Interface (HDMI, trademark), Light Peak (Thunderbolt (trademark)), and an earphone-microphone connector. The connector 14 may be a dedicated terminal such as a dock connector. Examples of a device to be connected to the connector 14 include, but not limited to, an external storage, a speaker, and a communication device.

The accelerometer 15 measures information indicating a direction and a magnitude of acceleration that affects the smartphone 1. The azimuth sensor 16 detects information indicating the orientation of the earth's magnetic field. The gyroscope 17 detects information on an angle and an angular velocity of the smartphone 1. The magnetic sensor 18 detects information on the magnetic force around the smartphone 1. The air-pressure sensor 19 detects information on the pressure (atmospheric pressure) outside the smartphone 1. The air-pressure sensor 19 is located inside the housing 20. The interior and the exterior of the housing 20 are in pneumatic communication with each other through holes through which not water but air can pass. Consequently, the air-pressure sensor 19 can detect the pressure outside the smartphone 1 while being inside the housing 20. The detection results of the accelerometer 15, the azimuth sensor 16, and the gyroscope 17 are used in combination, for example, to detect change in the position and the attitude of the smartphone 1.

The vibrator 22 vibrates the housing 20. The vibrator includes, for example, piezoelectric elements or an eccentric motor to generate vibrations. The light emitter 23 is, for example, located in the back face 1B to emit light. The light emitter 23 functions as a luminaire to illuminate the surroundings, and is used when, for example, the camera 13 captures an image. The luminance of the light emitter 23 is higher than, for example, the maximum value of the luminance of the display 2A.

The GPS receiver 24 receives a radio wave signal in a predetermined frequency band from GPS satellites. The GPS receiver 24 performs demodulation processing on the received radio wave signal, and sends out the processed signal to the controller 10. The GPS receiver 24 supports processing of calculating the current position of the smartphone 1. The receiver of a radio wave signal from positioning artificial satellites other than GPS satellites may support the processing of calculating the current position of the smartphone 1. The GPS receiver 24 can be regarded as one type of sensors in view of its application to detect the current position.

A part or all of the programs and the data stored in the storage 9 in FIG. 5 may be downloaded from the other devices through communication via the communication unit 6. The part or all of the programs and the data stored in the storage 9 in FIG. 5 may be stored in a non-transitory storage medium that can be read by a reader included in the storage 9. The part or all of the programs and the data stored in the storage 9 in FIG. 5 may be stored in a non-transitory storage medium that can be read by a reader connected to the connector 14. Examples of the non-transitory storage medium include, but not limited to, optical discs such as a CD (trademark), a DVD (trademark), and Blu-ray (trademark), a magneto-optical disk, a magnetic storage medium, a memory card, and a solid-state storage medium.

The configuration of the smartphone 1 illustrated in FIG. 5, which is an example, may be appropriately changed as long as the gist of the present disclosure is not impaired. For example, the number and types of the buttons 3 are not limited to those in the example in FIG. 5. The smartphone 1 may include, as buttons for operating on an image, numeric keypad buttons or QWERTY buttons instead of the buttons 3A to 3C. The smartphone 1 may or may not include a single button to operate on an image. Although the smartphone 1 includes the two cameras in the example illustrated in FIG. 5, the smartphone 1 may or may not include a single camera. Although the smartphone 1 includes the three types of sensors (the accelerometer 15, the azimuth sensor 16, and the gyroscope 17) to detect a position and an attitude in the example illustrated in FIG. 5, the smartphone 1 may not include some of the sensors. Alternatively, the smartphone 1 may include the other types of sensors to detect at least one of a position and an attitude.

Next, the control exercised by the smartphone 1 will be described with reference to FIGS. 6 to 9. FIGS. 6 to 9 are flowcharts each illustrating one example of the control exercised by the smartphone according to one embodiment.

First, the entire processing exercised by the smartphone 1 will be described with reference to FIGS. 6 and 7. The smartphone 1 can implement the functions illustrated in FIGS. 6 and 7 by the controller 10 executing the control program 9A stored in the storage 9. The controller 10 may execute the processing procedure of the other functions in parallel with the processing procedure illustrated in FIGS. 6 and 7. The controller 10 may perform the processes illustrated in FIG. 6 repeatedly with a predetermined period or using change in the state of the smartphone 1 (for example, change between a normal state and a sleep state) as a trigger.

First in Step S12, the controller 10 determines whether an image is being displayed. In other words, the controller 10 determines whether an image is being displayed on the display 2A. If determining that an image is not being displayed (No in Step S12), the controller 10 returns to the process in Step S12. If determining that an image is being displayed (Yes in Step S12), the controller 10 obtains the detection results of the sensors in Step S14. Specifically, the controller 10 obtains at least one of the detection results of the accelerometer 15, the gyroscope 17, and the magnetic sensor 18, and at least one of the detection results of the communication unit 6 and the GPS receiver 24. At least one of the detection results of the accelerometer 15, the gyroscope 17, and the magnetic sensor 18 is used for detecting a moving state and for determining whether the user is walking. At least one of the detection results of the communication unit 6 and the GPS receiver 24 is used for determining whether the user who carries the smartphone 1 is in the predetermined area 120.

After obtaining the detection results of the sensors, the controller 10 determines whether the user is walking in Step S16. Specifically, the controller 10 compares, with the moving state data 9C, at least one of the detection results of the accelerometer 15, the gyroscope 17, and the magnetic sensor 18 (first information), and determines whether the user is walking based on a result of the comparison. The moving state data 9C includes, for example, the typical acceleration time-series data while the user is walking as the registered data for walking. The controller 10 determines whether the detection result of the accelerometer 15 is similar to the registered data, and determines that the user is walking when determining that these are similar to each other. The states where the user is not walking include a state where, for example, the user stops for a long period, and a state where the user is moving by another transportation means, for example, bicycle, motorcycle, automobile, train, amphibian car, ship, or airplane. The states where the user is walking include a state where the user is moving on foot. The moving of the user on foot is a state where the user is moving by himself or herself without taking any vehicle for assisting the movement. The moving of the user on foot includes at least one of a walk, i.e., being walking and a run, i.e., being running. The moving of the user on foot also includes a state where the user stops temporarily (for a short period) without moving on foot. The moving of the user on foot also includes walking of the user with, for example, a cane or a cart.

If determining that the user is not walking (No in Step S16), the controller 10 returns to the process in Step S12. If determining that the user is walking (Yes in Step S16), the controller 10 determines whether the user is in the predetermined area 120 (may be referred to as an intersection area) in Step S18. The controller 10 according to one embodiment determines whether the communication between the smartphone 1 and the roadside unit 104 is established, based on information obtained from the communication unit 6 (second information) and the situation determination data 9B. If determining that the communication between the smartphone 1 and the roadside unit 104 is established, the controller 10 determines that the user is in the intersection area. In other words, the controller 10 determines that the user is in the predetermined area 120 if it can receive a signal from the roadside unit 104 installed in the predetermined area 120.

One example of the processes will be specifically described with reference to FIG. 7. In Step S32, the controller 10 detects an apparatus capable of near-field communication based on the detection results of the sensors. The apparatus capable of communication is a communication apparatus in a range where a signal with which data can be transmitted and received reaches. If detecting the apparatus capable of communication, the controller 10 determines whether the apparatus can communicate with the roadside unit 104 in Step S34. If determining that the apparatus can communicate with the roadside unit 104 (Yes in Step S34), the controller 10 determines that the user is in an intersection area in Step S36. If determining that the apparatus cannot communicate with the roadside unit 104 (No in Step S34), the controller 10 determines that the user is not in an intersection area in Step S38. Through such processes, the controller 10 determines whether the user is in an intersection area based on a result of the communication of the communication unit 6.

If determining that the user is not in the intersection area (No in Step S18), the controller 10 causes the display 2A to display a first image in Step S19. The first image is an image on which a first broadcast image whose background is transparent and which includes a message saying "caution against smartphone use while walking" is stacked on an image displayed immediately before Step S9. This first broadcast image may be, for example, preset and stored in the storage 9, etc. If determining that the user is in the intersection area (Yes in Step S18), the controller 10 causes the display 2A to display a second image in Step S20, and the vibrator 22 to vibrate the housing 20 in Step S22. The second image is an image on which a second broadcast image whose background is transparent and which includes a message saying "pay attention to surroundings" is stacked on an image displayed immediately before Step S20. The second broadcast image is, for example, an image different from the first broadcast image, and has a broadcast level higher than that of the first broadcast image. The broadcast level herein indicates, for example, necessity, urgency, or importance of broadcasting. In the aforementioned examples, the broadcast levels differ depending on details of the messages. For example, the fact that the message saying "pay attention to surroundings" is in greater need for attention to the surroundings than the message saying "caution against smartphone use while walking" can be broadcast to the user. The second broadcast image may be, for example, preset and stored in the storage 9, etc.

If detecting a walk as described above, the smartphone 1 changes a broadcasting method depending on whether the user is in the intersection area (predetermined area 120). Consequently, if the user is in the predetermined area 120 where extra attention is necessary, the broadcast can be performed in an easy-to-understand method for the user. Since the broadcasting method can be changed according to the necessity of the broadcasting, a broadcast can be performed for the user in a more appropriate broadcast level. Consequently, the user can appropriately know a state where extra attention is necessary.

If determining that the user is in the intersection area, the smartphone 1 according to one embodiment may perform a broadcast using the vibrator 22. Specifically, if determining that the user is walking and is in the intersection area, the controller 10 may cause the vibrator 22 to vibrate the housing 20. This vibration enables the user to receive a broadcast not only visually but also tactilely. Thus, the user can more easily recognize the broadcasting. Consequently, the necessity of the broadcasting will be higher if the broadcast is performed in a plurality of broadcasting methods. In other words, the broadcast level of the broadcast involving a plurality of broadcasting methods is higher than that of the broadcast in a single broadcasting method. The vibration of the housing 20 makes it difficult for the user to use the smartphone 1. Thus, it is possible to reduce the possibility for the user to use a screen display on the smartphone 1 while walking through an intersection.

If determining that the user is in the intersection area and is walking, the smartphone 1 may perform a broadcast to the user, for example, in a method other than the vibration of the vibrator 22 in addition to producing a screen display on the display 2A. The broadcasting method may be outputting an alarm sound or an alarm message from the speaker 11, or causing the light emitter 23 to emit light to perform a broadcast through the light. The use of the smartphone 1 can be broadcast to the surrounding people through sound or light. In other words, the user can receive a broadcast not only visually through the display 2A but also tactilely or visually through the light emitter 23. The user can more easily recognize the broadcasting because the user can receive a plurality of broadcasts. The smartphone 1 can perform broadcasts in a high broadcast level according to a plurality of broadcasting methods. The volume of the speaker 11 is higher than that of the receiver 7. Upon output of sound with a high volume from the speaker 11, the surrounding people may feel noisy. The luminance of the light emitted from the light emitter 23 is higher than, for example, that from the display 2A. Upon output of the light with high luminance from the light emitter 23, the surrounding people may feel glare. In other words, these may annoy the surrounding people. Thus, the environment where the user easily stops using the smartphone 1 can be created.

Figure 6:
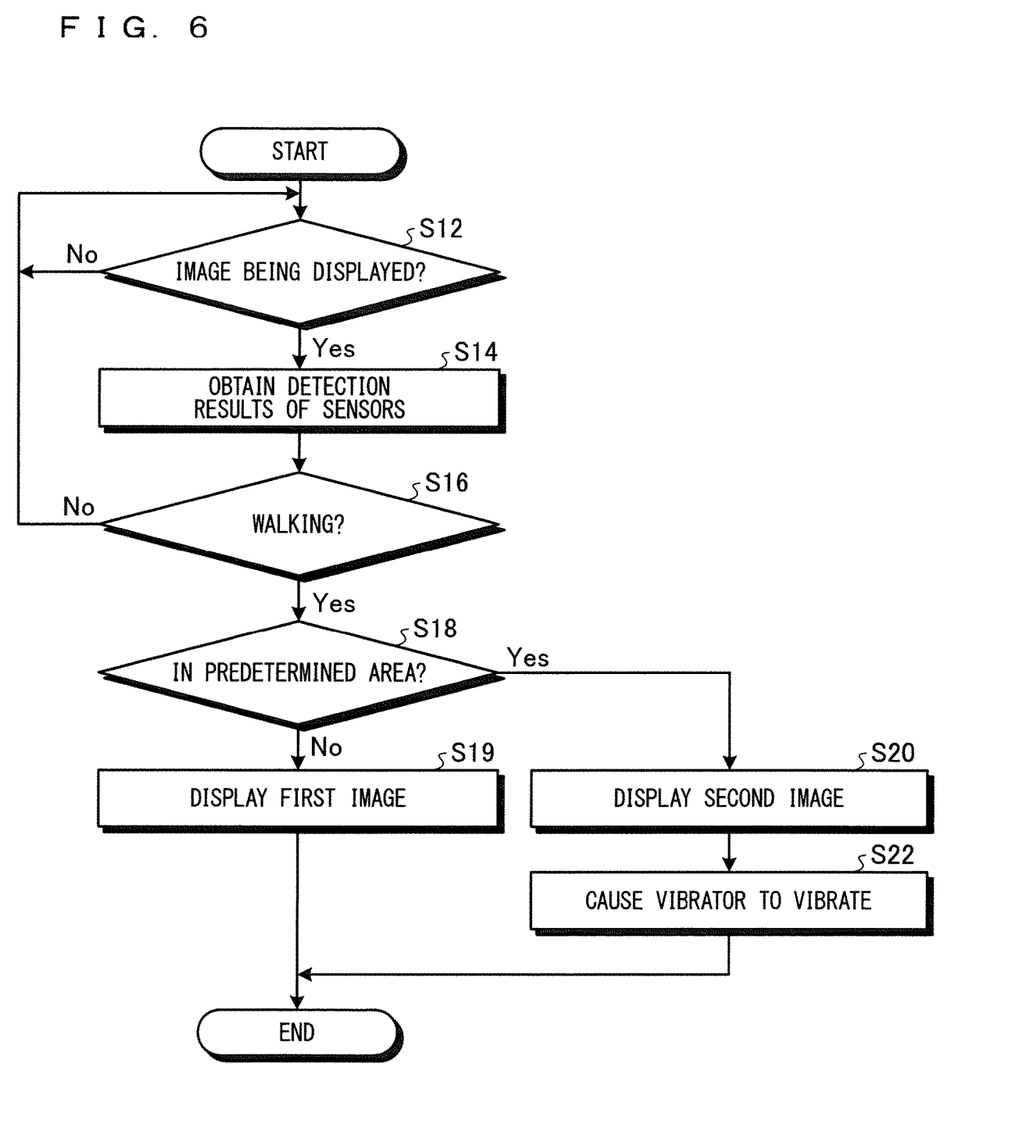
FIG. 6 illustrates a flowchart showing one example of control exercised by a smartphone according to one embodiment.
Figure 7:
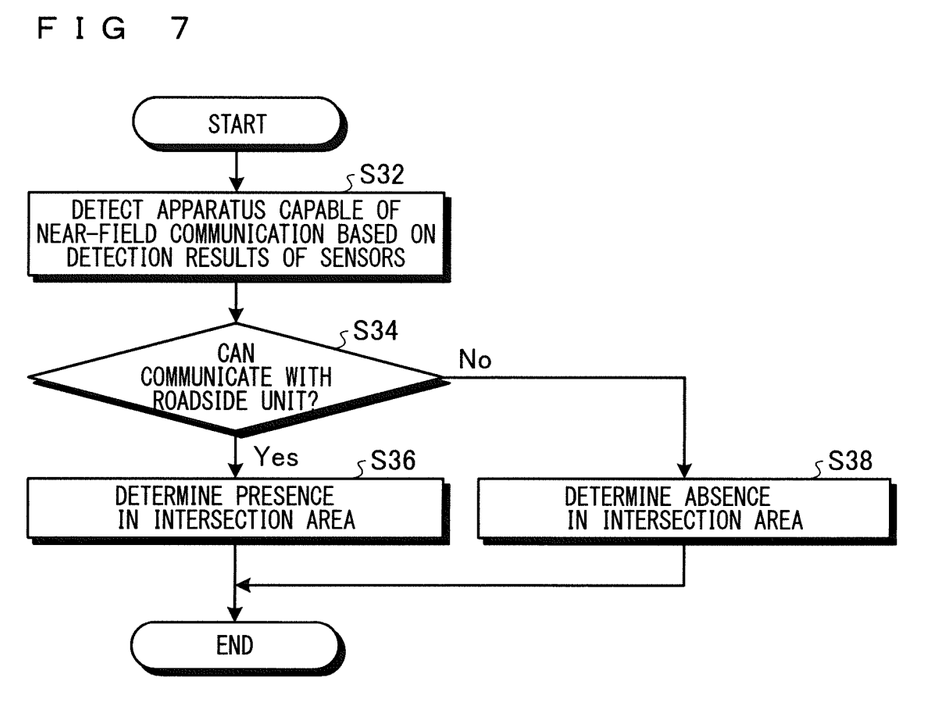
FIG. 7 illustrates a flowchart showing one example of control exercised by a smartphone according to one embodiment.

The controller 10 obtains the detection results of the sensors, using the image being displayed as a trigger in the processes illustrated in FIG. 6. However, data for determining whether the user is walking and data for determining the surrounding situation may be obtained always or in a process separate from the processes illustrated in FIG. 6. As long as the controller 10 can switch, based on a state where the user is walking, the processes to be executed, the order of determining whether the user is walking and determining whether the user is in an intersection area may be reversed.

Although the controller 10 changes, if determining that the user is walking, a message to be displayed depending on whether the user is in an intersection area in the aforementioned embodiment, the messages may be unchanged.

Figure 8:
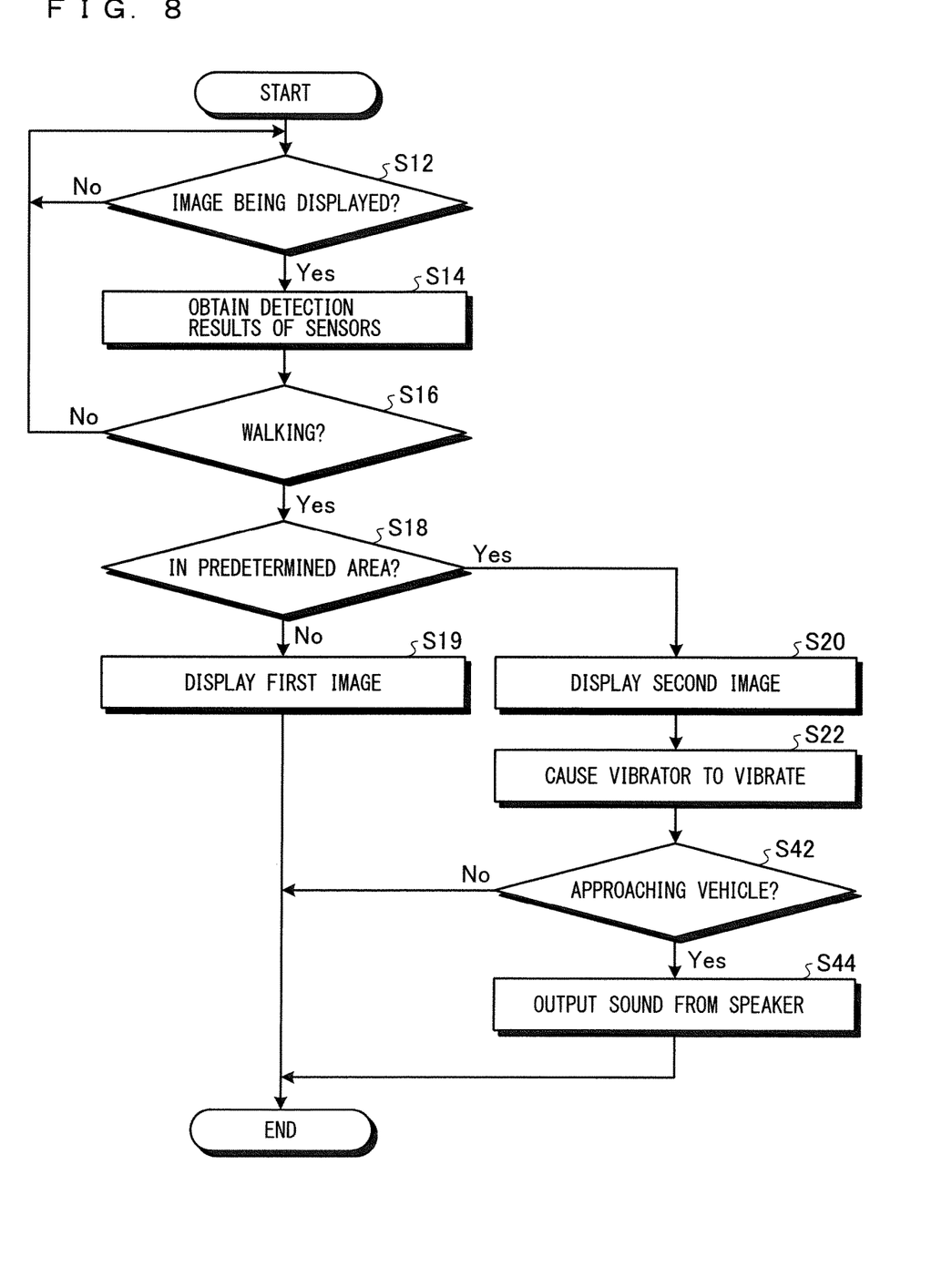
FIG. 8 illustrates a flowchart showing one example of control exercised by a smartphone according to one embodiment.

If detecting a situation with a higher risk from the surrounding situation while the user is in an intersection area, the smartphone 1 may perform a broadcast in a method of easily alerting the user. FIG. 8 illustrates a flowchart showing one example of control exercised by the smartphone according to one embodiment. The processes in FIG. 6 may be applied to those in FIG. 8 except for part thereof. The unique points in the processes in FIG. 8 will be hereinafter described.

The controller 10 determines that the user is walking in Step S16, and determines that the user is in the intersection area in Step S18. After displaying the second image in Step S20 and causing the vibrator 22 to vibrate in Step S22, the controller 10 determines the presence or absence of a vehicle approaching the user in Step S42. If obtaining information (third information) from the roadside unit 104 through the communication unit 6 to obtain information indicating the presence of the vehicle 102 with which the roadside unit 104 can communicate, the controller 10 determines the presence of the vehicle approaching the user. If determining the absence of the vehicle approaching the user (No in Step S42), the controller 10 ends the processes. If determining the presence of the vehicle approaching the user (Yes in Step S42), the sound is output from the speaker 11 in Step S44. The sound output from the speaker 11 may be an alarm sound or an alarm message.

If determining that the user is walking, determining that the user is in the intersection area, and determining the presence of the vehicle approaching the user, the controller 10 may broadcast the necessity of the extra attention to the user by three means of display, vibration, and sound. Consequently, if the user displays an image while walking, the smartphone 1 may perform more appropriate broadcast processes depending on a state. In other words, the controller 10 causes a broadcast unit to perform the first broadcast (for example, broadcasting by vibration) while causing the display 2A to produce a screen display if (i) determining that the user is walking and (ii) determining that the user is in the intersection area. The controller 10 causes the broadcast unit to perform not only the first broadcast but also the second broadcast (for example, broadcasting by sound) different from the first broadcast while causing the display 2A to produce a screen display if (i) determining that the user is walking, (ii) determining that the user is in the intersection area, and (iii) determining the presence of the vehicle in proximity to the user.

The smartphone 1 may also cause the display 2A to display a third image different from the first and second images if determining that the user is walking, determining that the user is in the intersection area, and determining the presence of the vehicle approaching the user. The third image includes, for example, a message saying "collision risk". The "collision risk" is text in greater need for attention than the message in the second image. In other words, the broadcast level of the third image is higher than that of the second image.

The smartphone 1 may restrict operations on an image if determining that the user is walking, determining that the user is in the intersection area, and determining the presence of the vehicle approaching the user. Alternatively, the smartphone 1 may restrict operations on an image if determining that the user is walking and determining that the user is in the intersection area. The smartphone 1 may enable operations on an image if determining that the user is walking and determining that the user is not in the intersection area. In other words, the smartphone 1 may release restriction on the operations on an image. Alternatively, the smartphone 1 may enable operations on an image if determining that the user is walking and determining the absence of the vehicle approaching the user. The restriction on the operations on an image enables the user to concentrate on the operations on the smartphone 1 and reduce delay in addressing change in the surrounding situation.

Although the smartphone 1 according to one embodiment executes a broadcast using the broadcast unit if determining that the user is walking, determining that the user is in the intersection area, and determining the presence of the vehicle approaching the user, it may execute a broadcast using the broadcast unit if determining that the user is walking and determining the presence of the vehicle approaching the user. Here, the smartphone 1 may determine whether to be able to communicate directly with the vehicle 102, and determine whether the vehicle is approaching according to a result of the determination. Specifically, the controller 10 determines the presence of the vehicle 102 in proximity to the user if the controller 10 can communicate directly with the vehicle 102 through the communication unit 6. The broadcast unit performs a broadcast even if the user is not in a predetermined area and there is a vehicle approaching the user, so that the necessary information can be appropriately broadcast to the user.

Although the object with which the smartphone 1 communicates is the roadside unit 104 and the object area is an intersection in the embodiment, the object and the object area are not limited to these. Examples of a state detector that obtains surrounding information may include the GPS receiver 24 in addition to or as a replacement for the communication unit 6. Here, the GPS receiver 24 receives information from GPS satellites, and identifies current position information based on this information. A high-risk road among roads may be preset to the smartphone 1 as a predetermined area. The smartphone 1 may determine whether the user is walking in this predetermined area, based on the position information and the predetermined area (or another detection result of the accelerometer 15). The smartphone 1 functioning as the state detector that obtains surrounding information may identify the current position information using the receiver of a radio wave signal from positioning artificial satellites other than GPS satellites.

Figure 9:
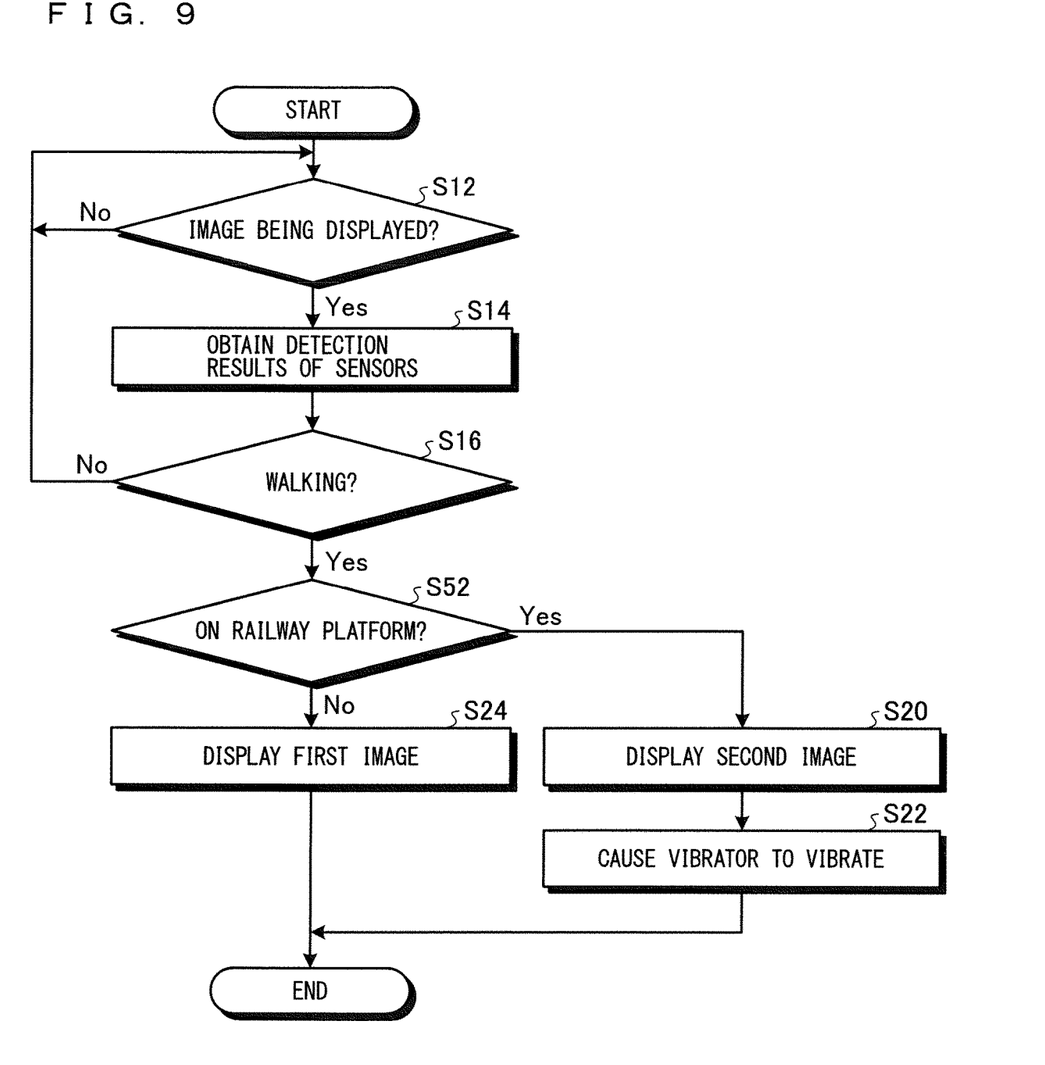
FIG. 9 illustrates a flowchart showing one example of control exercised by a smartphone according to one embodiment.

The predetermined area is, but not limited to, an intersection area in the embodiment. FIG. 9 illustrates a flowchart showing one example of control exercised by the smartphone according to one embodiment. The description of the processes in FIG. 9 that are similar to those in FIG. 6 will be simplified.

First in Step S12, the controller 10 determines whether an image is being displayed. If determining that an image is not being displayed (No in Step S12), the controller 10 returns to the process in Step S12. If determining that an image is being displayed (Yes in Step S12), the controller 10 obtains the detection results of the sensors in Step S14.

After obtaining the detection results of the sensors, the controller 10 determines whether the user is walking in Step S16. If determining that the user is not walking (No in Step S16), the controller 10 returns to the process in Step S12. If determining that the user is walking (Yes in Step S16), the controller 10 determines whether the user is on a railway platform in Step S52. The controller 10 according to one embodiment determines whether to establish communication with a communication unit installed on the railway platform, based on information obtained from the communication unit 6 and the situation determination data 9B. The controller 10 determines that the user is on the railway platform if determining that the communication with the communication unit installed on the railway platform is established.

If determining that the user is not on the railway platform (No in Step S52), the controller 10 displays the first image in Step S24. The first image is an image on which the first broadcast image whose background is transparent and which includes a message saying "caution against smartphone use while walking" is stacked on an image displayed immediately before Step S24. If determining that the user is on the railway platform (Yes in Step S52), the controller 50 displays the second image in Step S20, and causes the vibrator 22 to vibrate the housing 20 in Step S22. The second image is an image on which the second broadcast image whose background is transparent and which includes a message saying "pay attention to surroundings" is stacked on an image displayed immediately before Step S22.

Thus, not limited to intersections but various places may be set to the smartphone 1 as predetermined areas. If a place requiring attention is set to the predetermined area and the user is walking in the predetermined area, the smartphone 1 can broadcast the necessity of extra attention to the user through broadcasting in a high broadcast level using the broadcast unit.

Whether the user is on a railway platform may be determined based on not a result of the communication with the communication unit but the position information and map information.

If an escalator or stairs are set to the predetermined area, the smartphone 1 detects the presence of the user on the escalator or the stairs, and the user is walking, the smartphone 1 may perform a broadcast in a high broadcast level from the broadcast unit in addition to producing a screen display. Consequently, it is possible to reduce the possibility for the user to trip over and fall from the escalator or the stairs. Whether the user is on the escalator or the stairs may be determined based on change in the air pressure of the air-pressure sensor 19. In other words, the smartphone 1 can use the air-pressure sensor 19 as a state detector. The smartphone 1 may detect whether the user is on the escalator or the stairs, based on the position information and the map information or by communicating with a communication unit installed in the escalator or the stairs and capable of near-field communication.

The embodiments disclosed in the present application can be changed without departing from the gist and the scope of the disclosure. The embodiments and modifications thereof that are disclosed in the present application can be appropriately combined. For example, the embodiments may be modified as follows.

Each of the programs illustrated in FIG. 5 may be, for example, divided into a plurality of modules or combined with another program.

Although the smartphone is described as an example mobile electronic apparatus in the embodiments, an apparatus in the attached claims is not limited to a smartphone. The apparatus in the attached claims may be a mobile electronic apparatus other than smartphones. The mobile electronic apparatus only needs to comprise a display, an operating unit, and a communication unit that communicates with another apparatus. Examples of the mobile electronic apparatus include, but not limited to, a mobile phone, a tablet, a portable personal computer, a digital camera, a media player, an electronic book reader, a navigator, and a gaming machine.

Description herein has been given of characteristic embodiments for the purpose of clearly disclosing a technology relating to the attached claims. The attached claims, however, should not be limited to the above embodiments, but should be embodied by all of the modifications and alternative configurations that may be created by a person skilled in the art within the scope of basic matters described in the DESCRIPTION. The various embodiments can be combined with each other.

The invention claimed is:

1. A mobile electronic apparatus, comprising:
a display;
a first detector configured to obtain first information;
a second detector configured to communicate with a roadside unit to obtain second information from the roadside unit;
a broadcaster; and
at least one processor,
wherein the at least one processor is configured to cause the display to display a first image when detecting, based on the first information, that a user is walking and determining, based on the second information, that the user is in an area other than a predetermined area,
the at least one processor is configured to cause the display to produce a screen display and causes the broadcaster to perform a first broadcast if detecting, based on the first information, that the user is walking and determining, based on the second information, that the user is in the predetermined area,
the second detector is configured to communicate with the roadside unit while the user is in the predetermined area to obtain third information from the roadside unit upon the at least one processor detecting that the user is walking and is in the predetermined area, and is configured to refrain from communicating with the roadside unit to obtain the third information upon the at least one processor determining that the user is outside of the predetermined area, and
the at least one processor is configured to cause the broadcaster to perform, in addition to the first broadcast, a second broadcast different from the first broadcast if detecting that the user is walking, determining that the user is in the predetermined area, and determining whether or not a moving object is approaching the user based on the third information after having caused the broadcaster to perform the first broadcast.

2. The mobile electronic apparatus according to claim 1, wherein the at least one processor causes the display to display a second image different from the first image if detecting that the user is walking and determining that the user is in the predetermined area.

3. The mobile electronic apparatus according to claim 1, wherein the broadcaster performs broadcasts according to a plurality of broadcasting methods.

4. The mobile electronic apparatus according to claim 1, wherein the second detector comprises a near-field communication unit, and
the at least one processor determines whether the user is in the predetermined area, based on the second information received from an apparatus with which the at least one processor establishes communication through the near-field communication unit.

5. The mobile electronic apparatus according to claim 1, wherein the second detector comprises a position detector configured to detect global position information, and
the at least one processor determines whether the user is in the predetermined area, based on the position information detected by the position detector.

6. The mobile electronic apparatus according to claim 1, wherein the broadcaster comprises a vibrator.

7. The mobile electronic apparatus according to claim 1, wherein the broadcaster comprises a sound output unit.

8. The mobile electronic apparatus according to claim 1, wherein the broadcaster comprises a light emitter.

9. A mobile electronic apparatus control method for controlling a mobile electronic apparatus comprising a display, the method comprising the steps of:

obtaining first information, and determining, based on the first information, whether a user is walking;
   obtaining second information from a roadside unit, and determining, based on the second information, whether the user is in a predetermined area;
   causing the display to display a first image upon detection that the user is walking and upon determination that the user is in an area other than the predetermined area, and causing the display to produce a screen display and performing a first broadcast separately from producing the screen display upon detection that the user is walking and upon determination that the user is in the predetermined area;
   obtaining third information from the roadside unit upon detection that the user is walking and is in the predetermined area, and refraining from communicating with the roadside unit to obtain the third information upon detection that the user is outside of the predetermined area; and
   causing a broadcaster to perform, in addition to the first broadcast, a second broadcast different from the first broadcast if detecting that the user is walking, determining that the user is in the predetermined area, and determining whether or not a moving object is approaching the user based on the third information after having caused the broadcaster to perform the first broadcast.

10. A non-transitory computer readable recording medium that stores a mobile electronic apparatus control program for causing a mobile electronic apparatus comprising a display to execute the steps of:

obtaining first information, and determining, based on the first information, whether a user is walking;
   obtaining second information from a roadside unit, and determining, based on the second information, whether the user is in a predetermined area;
   causing the display to display a first image upon detection that the user is walking and upon determination that the user is in an area other than the predetermined area, and causing the display to produce a screen display and performing a first broadcast separately from producing the screen display upon detection that the user is walking and upon determination that the user is in the predetermined area;
   obtaining third information from the roadside unit upon detection that the user is walking and is in the predetermined area, and refraining from communicating with the roadside unit to obtain the third information upon detection that the user is outside of the predetermined area; and
   causing a broadcaster to perform, in addition to the first broadcast, a second broadcast different from the first broadcast if detecting that the user is walking, determining that the user is in the predetermined area, and determining whether or not a moving object is approaching the user based on the third information after having caused the broadcaster to perform the first broadcast.

* * * * *